United States Patent
Shiomi

(10) Patent No.: US 11,368,085 B2
(45) Date of Patent: Jun. 21, 2022

(54) POWER REGENERATION SNUBBER CIRCUIT AND POWER SUPPLY DEVICE

(71) Applicant: SHARP KABUSHIKI KAISHA, Sakai (JP)

(72) Inventor: Takeshi Shiomi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/333,512

(22) Filed: May 28, 2021

(65) Prior Publication Data

US 2021/0408896 A1    Dec. 30, 2021

(30) Foreign Application Priority Data

Jun. 29, 2020    (JP) .............................. JP2020-111850

(51) Int. Cl.
*H02M 1/34*    (2007.01)
*H02M 3/335*   (2006.01)

(52) U.S. Cl.
CPC ....... *H02M 1/346* (2021.05); *H02M 3/33592* (2013.01)

(58) Field of Classification Search
CPC .......... H02M 1/32; H02M 1/34; H02M 1/346; H02M 3/33592; H02M 3/33576; H02M 3/33573
See application file for complete search history.

(56) References Cited

U.S. PATENT DOCUMENTS

| | | | |
|---|---|---|---|
| 5,847,548 A * | 12/1998 | He ...................... | H02M 3/1584 323/222 |
| 2021/0408898 A1* | 12/2021 | Shiomi ............. | H02M 3/33592 |
| 2022/0013329 A1* | 1/2022 | Bowman ........... | H01J 37/32174 |

FOREIGN PATENT DOCUMENTS

JP    2009-247132 A    10/2009

\* cited by examiner

*Primary Examiner* — Adolf D Berhane
(74) *Attorney, Agent, or Firm* — ScienBiziP, P.C.

(57) ABSTRACT

A snubber circuit connected to a rectifying circuit including a reference potential node, an output potential node, and the snubber circuit comprises a snubber capacitor; a snubber diode; and a snubber resistor, wherein a negative electrode of the snubber capacitor is connected to the reference potential node, an anode of the snubber diode is connected to the switch node and a cathode of the snubber diode is connected to a positive electrode of the snubber capacitor, one end of the snubber resistor is connected to the positive electrode of the snubber capacitor, and another end of the snubber resistor is connected to the output potential node, and a reverse recovery time of the snubber diode is longer than a reverse recovery time of the rectifying element.

9 Claims, 5 Drawing Sheets

POWER REGENERATION SNUBBER CIRCUIT AND POWER SUPPLY DEVICE

CROSS-REFERENCE TO RELATED APPLICATION

The present application claims priority from Japanese Application JP2020-111850, the content of which is hereby incorporated by reference into this application.

BACKGROUND

1. Field

The following disclosure relates to a snubber circuit. The snubber circuit is added to suppress a surge voltage applied to a switch element. On the other hand, losses that occur in the snubber circuit are also problematic. JP 2009-247132 A discloses a circuit for reducing losses in a snubber circuit.

SUMMARY

However, even with such a snubber circuit, there is still room for loss reduction. One aspect of the present disclosure has an object to provide a snubber circuit capable of reducing losses as compared to the related art.

In order to solve the above problem, a snubber circuit according to one aspect of the present disclosure is a snubber circuit connected to a rectifying circuit including a reference potential node, an output potential node, and a switch node, a voltage of the output potential node being set higher than a voltage of the reference potential node, a maximum voltage of the switch node being set higher than the voltage of the output potential node, a rectifying element being connected in a forward direction from the reference potential node toward the switch node, the snubber circuit including a snubber capacitor, a snubber diode, and a snubber resistor, wherein a negative electrode of the snubber capacitor is connected to the reference potential node, an anode of the snubber diode is connected to the switch node and a cathode of the snubber diode is connected to a positive electrode of the snubber capacitor, one end of the snubber resistor is connected to the positive electrode of the snubber capacitor, and another end of the snubber resistor is connected to the output potential node, and a reverse recovery time of the snubber diode is longer than a reverse recovery time of the rectifying element.

According to one aspect of the present disclosure, it is possible to reduce the losses in the snubber circuit.

DESCRIPTION OF EMBODIMENTS

First Embodiment

Figure 1:
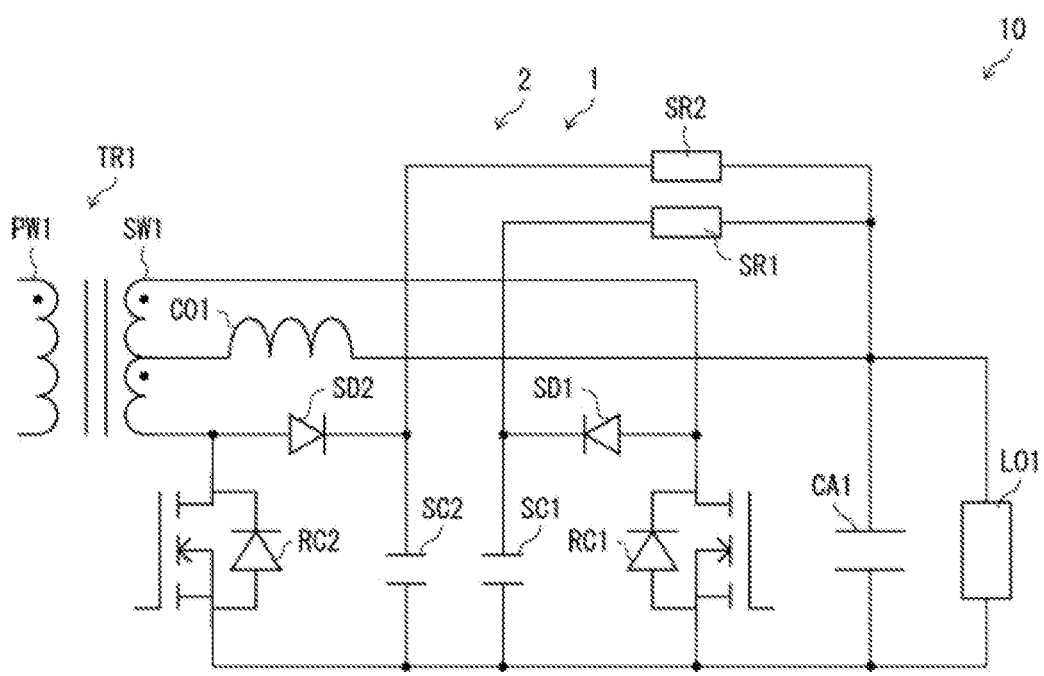
FIG. 1 is a diagram illustrating a snubber circuit and a rectifying circuit according to a first embodiment.

A snubber circuit 1 according to a first embodiment suppresses a surge voltage generated in a rectifying circuit 10 as well as suppresses losses generated in the snubber circuit 1. A circuit configuration of the rectifying circuit 10 and the snubber circuit 1 will be described using FIG. 1. Current paths of the snubber circuit 1 will be described using FIG. 2. Operation waveforms of the snubber circuit 1 will be described using FIG. 3. For the sake of brevity, "transformer TR1" is also simply referred to as "TR1", for example. Note that each numerical value described below is merely an example.

Overview of Rectifying Circuit 10

The rectifying circuit 10 is a secondary side rectifying circuit of an insulating DC-DC converter 100 (described below). The rectifying circuit 10 converts an AC electromotive force of the transformer TR1 induced by a primary side circuit of the insulating DC-DC converter 100 to a DC voltage. This circuit is referred to as a center tap rectifying circuit, and performs full-wave rectification.

Configuration of Rectifying Circuit 10

The transformer TR1 includes a primary winding PW1 and a secondary winding SW1. PW1 is connected to the primary side circuit, and SW1 is connected to the secondary side circuit. SW1 is a two-turn winding, and one end of a smoothing coil CO1 is connected to a midpoint (center tap) of SW1. A positive electrode of the smoothing capacitor CA1 is connected to the other end of CO1. A negative electrode of CA1 is connected to a reference potential node. A load LO1 is connected in parallel to CA1. One end of SW1 is connected to the reference potential node via a rectifying element RC1. A connection point between the one end of SW1 and the RC1 is a first switch node. The other end of SW1 is connected to the reference potential node via a rectifying element RC2. A connection point between the other end of SW1 and RC2 is a second switch node.

A voltage of the reference potential node is 0 V. The positive electrode of CA1 is an output potential node and has a voltage of 12.5 V. The first and second switch nodes switch between approximately 0 V (during conduction) and approximately 35 V (during non-conduction) in voltage. This 35 V voltage is the maximum voltage of each switch node. The definition of "the maximum voltage of each switch node" does not include instantaneous voltages such as surge voltages and noises. The magnitude of the voltage of each node is set to "the reference potential node<the output potential node<the maximum voltage of each switch node".

CO1 has an inductance of 1.8 μH and a DC resistance of 0.3 mΩ. An average current is 80 A. CA1 has a capacitance of 8.8 mF. RC1 and RC2 are metal oxide semiconductor field effect transistors (MOSFETs) each having a drain breakdown voltage of 80 V. The MOSFETs are connected in parallel such that each of on resistances of RC1 and RC2 is 0.4 mΩ. Reverse recovery time of RC1 and RC2 is 70 ns.

The MOSFETs are applied as the rectifying elements, but diodes can also be applied. The rectifying elements refer to general elements that allow current to flow in only one direction except for a reverse recovery period. For example, a transistor is the rectifying element since the transistor "allows current to conduct from a source to a drain and cuts off current from the drain to the source" at a time of the gate-off.

AC Operation and Surge Voltage of Rectifying Circuit

The voltages of the first and second switch nodes connected to SW1 are switched by an AC electromotive force having a frequency of 66 kHz. The voltage of the first switch node is 35 V during the positive half-cycle and the voltage of the second switch node is 35 V during the negative half-cycle. The surge voltage is generated when switching to this 35 V, and instantaneously becomes 60 V. The surge voltages generated in the positive and negative cycles within one cycle are shifted in phase by 180 degrees between the first and second switch nodes with a frequency of 132 kHz, which is twice 66 kHz.

Configuration of Snubber Circuit

The snubber circuit connected to the rectifying circuit 10 includes snubber capacitors SC1 and SC2, snubber diodes SD1 and SD2, and snubber resistors SR1 and SR2. The snubber circuit 1 connected to the first switch node is configured as follows. A negative electrode of SC1 is connected to the reference potential node. An anode of SD1 is connected to the switch node, and a cathode of SD1 is connected to a positive electrode of SC1. One end of SR1 is connected to the positive electrode of SC1 and the other end of SR1 is connected to the output potential node.

A snubber circuit 2 connected to the second switch node is configured in a similar manner to the snubber circuit 1 by using SC2, SD2, and SR2.

Figure 2:
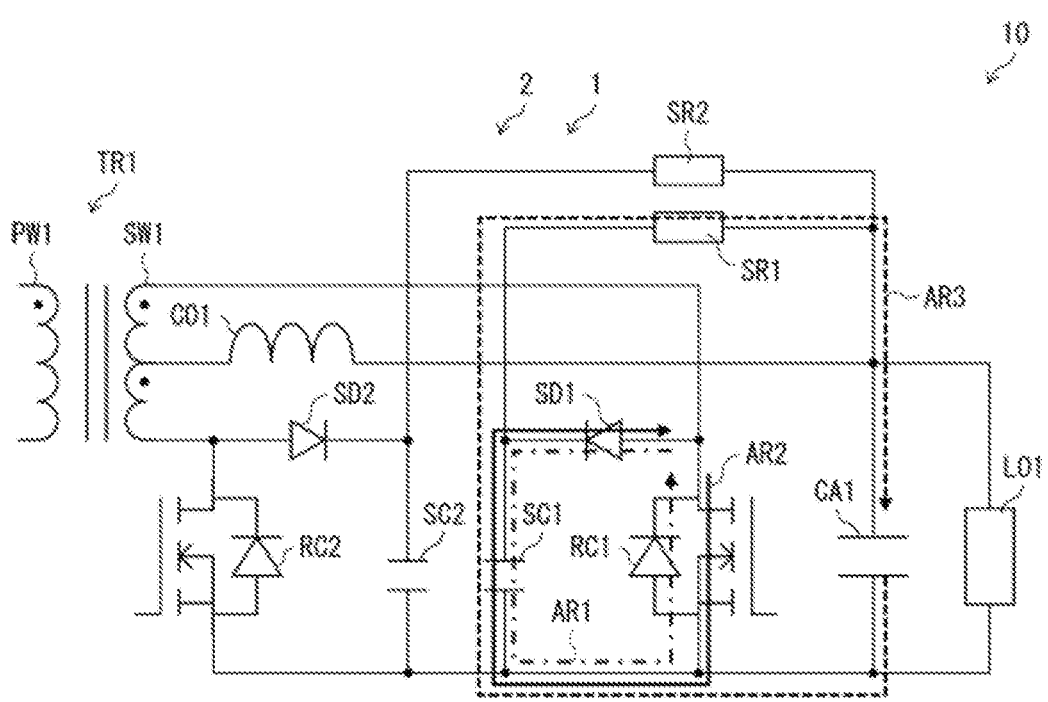
FIG. 2 is a diagram illustrating current paths of the snubber circuit.

In FIG. 1, SC1 and SC2 are not connected in parallel. However, as a modification example, SC1 and SC2 can be connected in parallel. When SC1 and SC2 are connected in parallel, the snubber capacitors can increase the capacitance and can increase the ability to absorb the surge power. Alternatively, one of the snubber capacitors can be reduced. In a case where SC1 and SC2 are connected in parallel, SR1 and SR2 are made parallel. In this case, one of the snubber resistors can be reduced.

SD1 and SD2 have a VF of 0.8 V at a point in time of the start of conduction and a resistance of 0.055Ω during conduction. The reverse recovery time is 150 ns, which is longer than that of RC1. In order to prolong the reverse recovery time, a PN diode using silicon (Si) is selected. The lower limit of the reverse recovery time of SD1 changes depending on the specification of SD1. In order to obtain the effect of the snubber circuit 1, a time longer than the reverse recovery time of RC1 is preferred. SC1 and SC2 have a capacitance of 80 nF. SR1 and SR2 have a resistance of 820Ω.

Operation of Snubber Circuit

Operation of the snubber circuit of the present embodiment will be described with the snubber circuit 1 as an example. The surge voltage generated at the first switch node charges SC1 using a path AR1 via SD1, SC1, and RC1. In other words, the forward conduction of SD1 charges SC1. Immediately thereafter, SD1 transitions to the reverse recovery period of the diode, and becomes a state in which SD1 allows current to flow from the cathode to the anode. The charged SC1 regenerates the current to the first switch node having the maximum voltage through a path AR2 via RC1, SC1, and SD1. At the same time, CA1 is charged using a path AR3 via SC1, SR1, and CA1. After the reverse recovery period of the diode is terminated, the current in the reverse direction (AR2) is cut off in SD1.

AR2 has a smaller voltage difference than that of AR3. In AR2, the maximum voltage of the first switch node is 35 V with respect to the voltage of SC1 of 35 V, and hence the voltages are approximately the same. In AR3, the voltage of the output potential node is 12.5 V with respect to the voltage of SC1 of 35 V, and hence the voltage difference is large. By regenerating the current to AR2 having a smaller voltage difference, losses can be reduced. This is because the losses depend on voltage×current.

In the rectifying circuit 10 to which the snubber circuit 1 is connected, the average voltage of SC1 is designed to be approximately the same level (±40%) as the maximum voltage of the switch node. In the present embodiment, it is designed to be approximately 35 V.

The operation of the snubber circuit 2 is the same as that of the snubber circuit 1.

Operation Waveforms of Snubber Circuit 1

Figure 3:
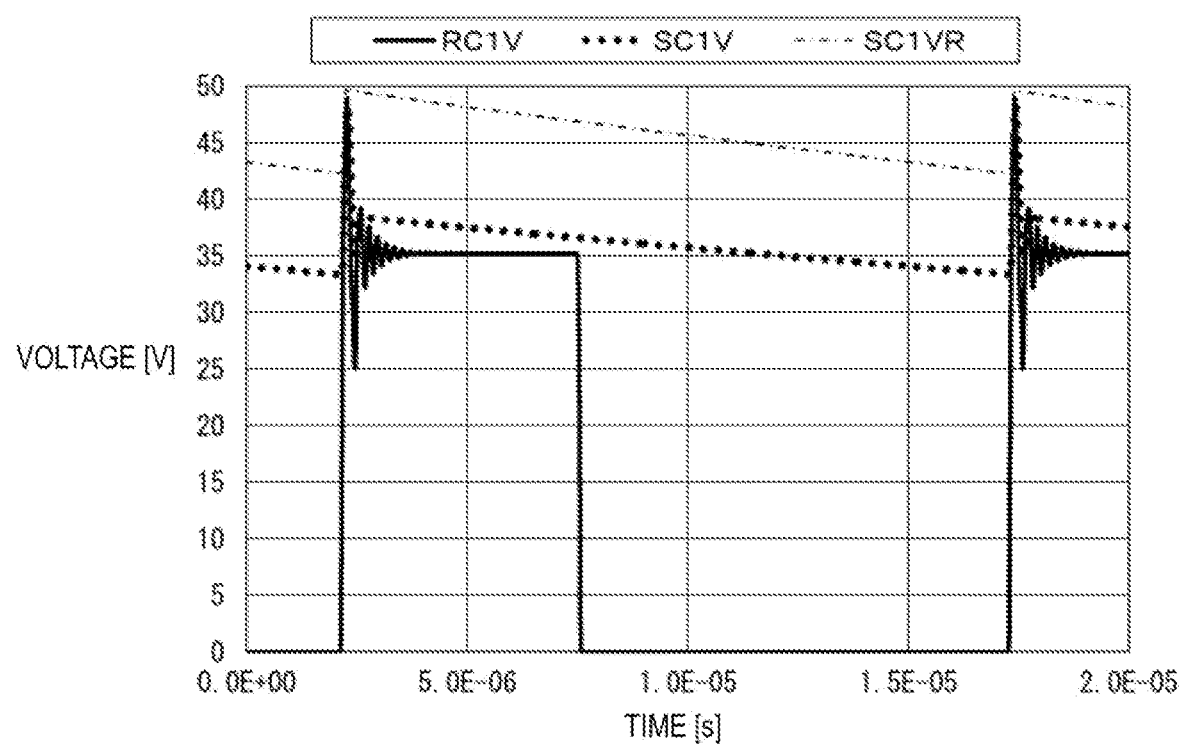
FIG. 3 is a diagram illustrating operation waveforms of the snubber circuit.

Operational waveforms of the power regeneration by the snubber circuit 1 will be described using FIG. 3. In FIG. 3, the vertical axis represents voltage and the horizontal axis represents time axis. Each item of the graph is as follows.

RC1V: Voltage of the first switch node
SC1V: Voltage of SC1
SC1VR: Voltage of SC1 of a comparative example In the present embodiment, the power absorbed by SC1 is regenerated to the first switch node by using the reverse recovery time of SD1. The reverse recovery period of the present embodiment is 150 ns, which is 10 times or more longer than that of the diode of the comparative example, i.e., 13 ns. Thus, as a result of the sufficient regeneration of the current to the switch node, SC1V is lower than SC1VR by 10 V. In addition, the surge voltage suppression effect of the snubber circuit 1 can also be confirmed. The instantaneous peak of the snubber circuit 1 can be reduced to 48 V whereas the instantaneous peak of the voltage of the first switch node is 60 V when the snubber circuit 1 is not connected. These can be confirmed by the maximum value of RC1V.

Improvements 1 to 3 of Snubber Circuit 1

In the first embodiment, a plurality of preferred improvements are applied. These preferred improvements will be described below.

Improvement 1: The reverse recovery time of the snubber diode is ½ or less of a cycle of the AC electromotive force.

During the reverse recovery time of SD1, by regenerating the current from SC1 to the switch node of the same voltage, losses are reduced. However, attention should also be paid to the upper limit value of the reverse recovery time of SD1. During the reverse recovery period of SD1, the voltage of the switch node is switched from 35 V to 0 V according to an AC cycle, so that the losses increase due to an increase in the voltage difference between SC1 and the switch node.

The upper limit value of the reverse recovery time of SD1 changes depending on a specification of the circuit. The reverse recovery time of SD1 is preferably ½ or less of a cycle of the AC electromotive force. In the present embodiment, the reverse recovery time of SD1 is set to 150 ns, which is ½ (7.5 μs) or less of the cycle of 15 μs.

Improvement 2: The Capacitance of the Snubber Capacitor is Greater than Coss of the Rectifying Element.

Coss (output capacitance) of RC1 is configured in parallel with SC1 via SD1. Generally, the capacitance of capacitors, Coss, or the like changes with a voltage. In a state where the switch node maximum voltage is applied, it is preferable that the capacitance of SC1 be greater than Coss of RC1. This is to allow a large amount of surge current to flow through SC1 having a large capacitance via SD1, at a time of application of the surge voltage. Flowing the large amount of surge forward current through SD1 leads to subsequent generation of the reverse recovery time. Thus, the capacitance (80 nF) of SC1 is set greater than Coss (24 nF) of RC1.

Improvement 3: Coss at a Time of Application of the Maximum Voltage of the Switch Node is ½ or Less of that at a Time of 0 V.

In a case where Coss of RC1 is ½ or less of that at a time of application of 0 V by the application of the maximum voltage of the switch node, a large amount of surge voltage is generated. This is because Coss decreases as the voltage increases, and the surge voltage absorption becomes difficult. Thus, by using the snubber circuit 1, the capacitances of the Coss and SC1 are made parallel in the reverse recovery period, so that the surge voltage or the ringing can be effectively suppressed.

Second Embodiment

Figure 4:
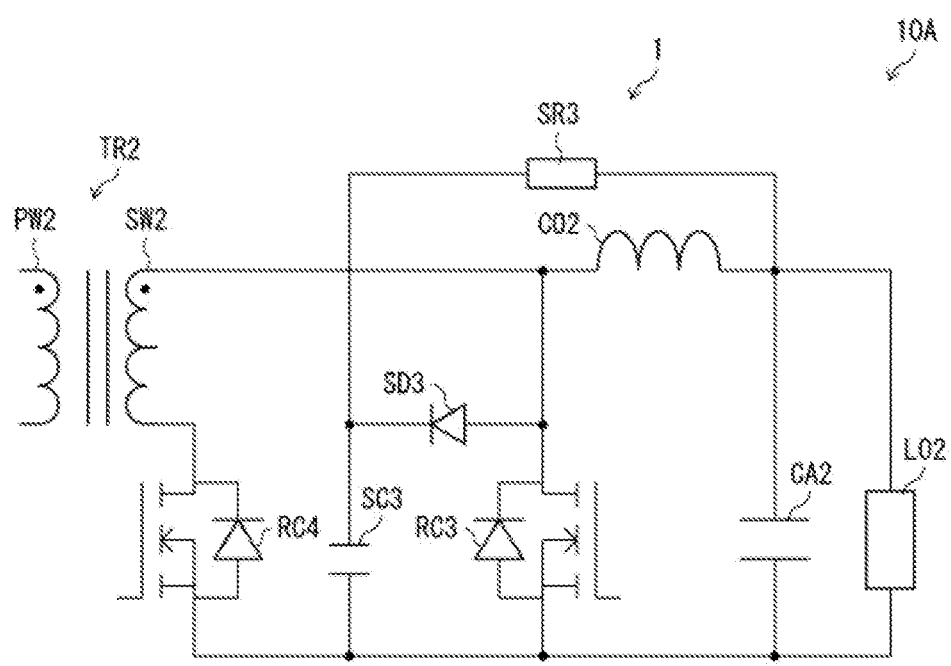
FIG. 4 is a diagram illustrating an application example of a snubber circuit 1 according to a second embodiment.

The snubber circuit 1 is applicable to any rectifying circuit including the reference potential node, the output potential node, and the first switch node. The present embodiment illustrates an application example of the snubber circuit 1 to a half-wave rectifying circuit 10A illustrated in FIG. 4.

A transformer TR2 includes a primary winding PW2 and a secondary winding SW2. RC3 and RC4 are included as rectifying elements. A smoothing coil CO2 and a smoothing capacitor CA2 are included. The snubber circuit 1 includes a snubber diode SD3, a snubber capacitor SC3, and a snubber resistor SR3. The first switch node is a connection point between SW2 and RC3. The voltage of the reference potential node is 0 V, the voltage of the output potential node is 12.5 V, and the maximum voltage of the switch node is 50 V. The snubber circuit 1 can also be applied to such a circuit.

Other application examples include a current doubler rectifying circuit or a full-bridge rectifying circuit. Similar to the first embodiment, these are rectifying circuits including the reference potential node, the output potential node, and the first and second switch nodes, and thus the snubber circuit 1 can be applicable.

Third Embodiment

Figure 5:
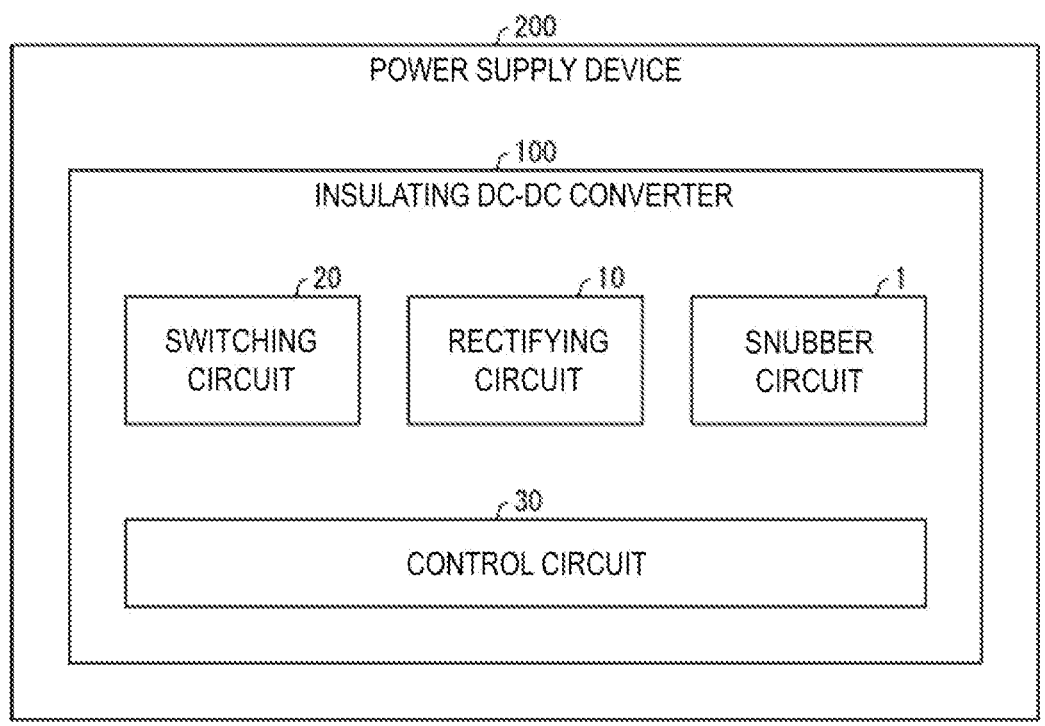
FIG. 5 is a diagram illustrating a power supply device according to a third embodiment.

FIG. 5 is a diagram illustrating a power supply device 200 including the snubber circuit 1. The power supply device 200 includes an insulating DC-DC converter 100. The insulating DC-DC converter 100 includes a switching circuit 20 as a primary side circuit, a rectifying circuit 10 as a secondary side circuit, the snubber circuit 1, and a control circuit 30. The switching circuit 20 and the rectifying circuit 10 are connected via a transformer. The snubber circuit 1 is directly connected to the rectifying circuit 10. The control circuit 30 is connected so that the on/off of each element provided in the insulating DC-DC converter 100 can be controlled.

Supplement

A snubber circuit according to a first aspect of the present disclosure is a snubber circuit connected to a rectifying circuit including a reference potential node, an output potential node, and a switch node, a voltage of the output potential node being set higher than a voltage of the reference potential node, a maximum voltage of the switch node being set higher than the voltage of the output potential node, a rectifying element being connected in a forward direction from the reference potential node toward the switch node, the snubber circuit including a snubber capacitor, a snubber diode, and a snubber resistor, a negative electrode of the snubber capacitor is connected to the reference potential node, an anode of the snubber diode is connected to the switch node and a cathode of the snubber diode is connected to a positive electrode of the snubber capacitor, one end of the snubber resistor is connected to the positive electrode of the snubber capacitor, and another end of the snubber resistor is connected to the output potential node, and a reverse recovery time of the snubber diode is longer than a reverse recovery time of the rectifying element.

According to the above-described configuration, the surge power generated at the switch node charges the snubber capacitor by the forward conduction of the snubber diode. The surge power used to charge the snubber capacitor is regenerated to the switch node by using the reverse recovery time of the snubber diode. By using the reverse recovery time of the snubber diode set longer, the surge power can be regenerated to the switch node having a small voltage difference, so that a snubber circuit having small losses can be realized.

In a snubber circuit according to a second aspect of the present disclosure, the rectifying circuit is a circuit configured to convert an AC electromotive force to a DC voltage, wherein the reverse recovery time of the snubber diode is ½ or less of a cycle of the AC electromotive force.

According to the above-described configuration, by setting the reverse recovery time of the snubber diode to ½ cycle or less of the AC electromotive force, a decrease in efficiency of the power regeneration via the snubber diode can be suppressed.

In a snubber circuit according to a third aspect of the present disclosure, the capacitance of the snubber capacitor at a time of application of the maximum voltage of the switch node is greater than an output capacitance of the rectifying element at the time of application of the maximum voltage of the switch node.

According to the above-described configuration, a large amount of forward current is allowed to flow through the snubber diode toward the large capacitance of the snubber capacitor. Thus, the reverse recovery time of the snubber diode that depends on the forward current conduction can be sufficiently generated.

In a snubber circuit according to a fourth aspect of the present disclosure, the output capacitance of the rectifying element at a time of application of the maximum voltage of the switch node is ½ or less of the output capacitance at a time of application of 0 V.

According to the above-described configuration, in the rectifying circuit including the output capacitance that becomes ½ or less at a time of voltage application, the surge voltage or the ringing is likely to be generated. By applying the present snubber circuit, the output capacitance and the snubber capacitor can be brought into a parallel state during the reverse recovery period, and the surge voltage or the ringing can be suppressed.

A power supply device according to a fifth aspect of the present disclosure includes the snubber circuit according to one aspect of the present disclosure.

According to the above-described configuration, the power supply device with reduced losses can be realized using the snubber circuit with reduced losses.

SUPPLEMENTARY INFORMATION

An aspect of the present disclosure is not limited to each of the embodiments described above. It is possible to make various modifications within the scope indicated in the claims. An embodiment obtained by appropriately combining technical elements each disclosed in different embodiments falls also within the technical scope of an aspect of the present disclosure. Furthermore, technical elements disclosed in the respective embodiments may be combined to provide a new technical feature.

While there have been described what are at present considered to be certain embodiments of the disclosure, it will be understood that various modifications may be made thereto, and it is intended that the appended claims cover all such modifications as fall within the true spirit and scope of the invention.

What is claimed is:

1. A snubber circuit connected to a rectifying circuit including a reference potential node, an output potential node, and a switch node,
   a voltage of the output potential node being set higher than a voltage of the reference potential node, a maximum voltage of the switch node being set higher than the voltage of the output potential node,
   a rectifying element being connected in a forward direction from the reference potential node toward the switch node, the snubber circuit comprising:
   a snubber capacitor;
   a snubber diode; and
   a snubber resistor,
   wherein a negative electrode of the snubber capacitor is connected to the reference potential node,
   an anode of the snubber diode is connected to the switch node and a cathode of the snubber diode is connected to a positive electrode of the snubber capacitor,
   one end of the snubber resistor is connected to the positive electrode of the snubber capacitor, and another end of the snubber resistor is connected to the output potential node, and
   a reverse recovery time of the snubber diode is longer than a reverse recovery time of the rectifying element.

2. The snubber circuit according to claim 1,
   wherein the rectifying circuit is a circuit configured to convert an AC electromotive force to a DC voltage, and
   the reverse recovery time of the snubber diode is ½ or less of a cycle of the AC electromotive force.

3. The snubber circuit according to claim 1,
   wherein a capacitance of the snubber capacitor at a time of application of the maximum voltage of the switch node is greater than an output capacitance of the rectifying element at the time of application of the maximum voltage of the switch node.

4. The snubber circuit according to claim 2,
   wherein a capacitance of the snubber capacitor at a time of application of the maximum voltage of the switch node is greater than an output capacitance of the rectifying element at the time of application of the maximum voltage of the switch node.

5. The snubber circuit according to claim 1,
   wherein an output capacitance of the rectifying element at a time of application of the maximum voltage of the switch node is ½ or less of the output capacitance at a time of application of 0 V.

6. The snubber circuit according to claim 2,
   wherein an output capacitance of the rectifying element at a time of application of the maximum voltage of the switch node is ½ or less of the output capacitance at a time of application of 0 V.

7. The snubber circuit according to claim 3,
   wherein the output capacitance of the rectifying element at the time of application of the maximum voltage of the switch node is ½ or less of the output capacitance at a time of application of 0 V.

8. The snubber circuit according to claim 4,
   wherein the output capacitance of the rectifying element at the time of application of the maximum voltage of the switch node is ½ or less of the output capacitance at a time of application of 0 V.

9. A power supply device comprising:
   the snubber circuit according to claim 1.

* * * * *